Figure 1:
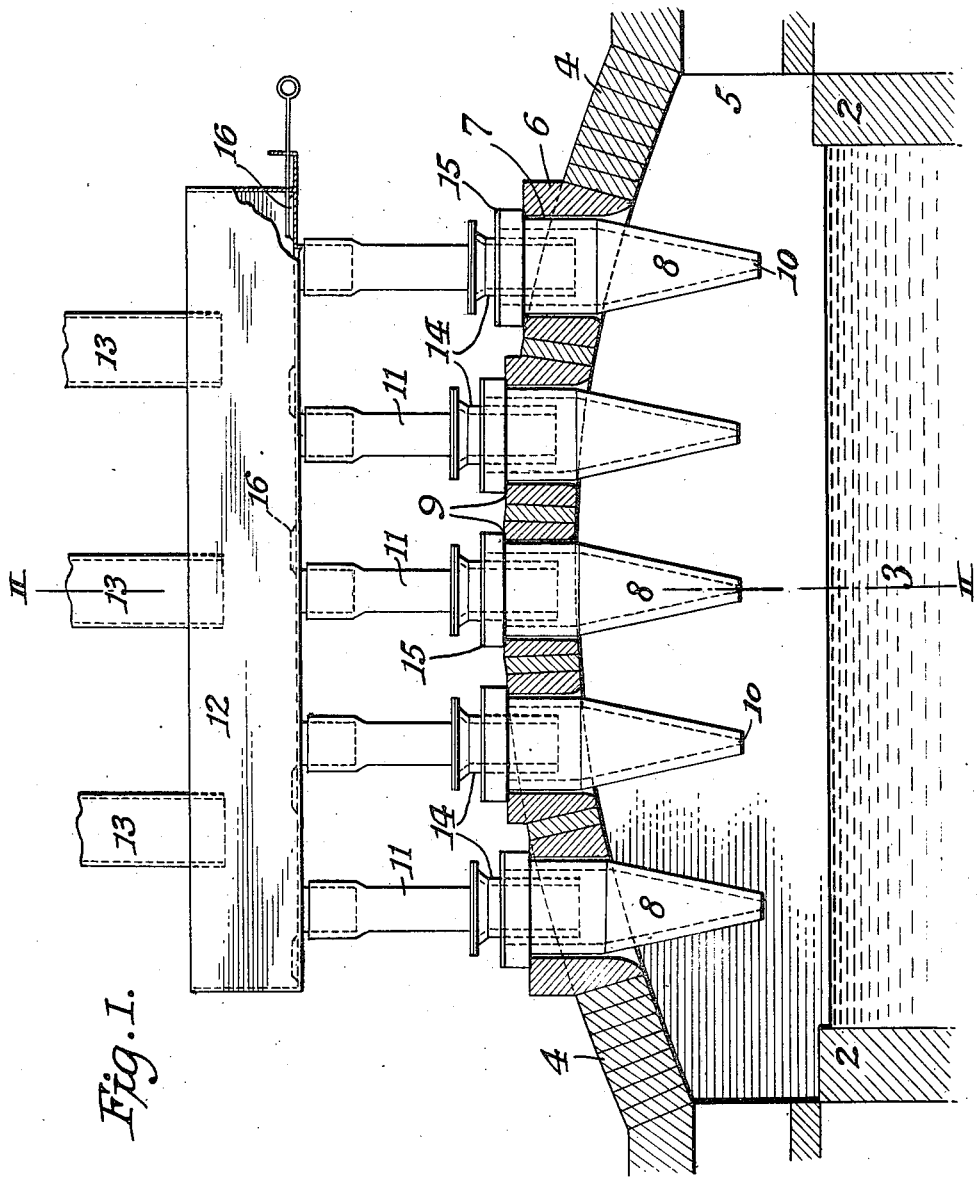

R. GOOD.
METHOD OF AND APPARATUS FOR THE MANUFACTURE OF GLASS.
APPLICATION FILED DEC. 1, 1919.
1,421,210.
Patented June 27, 1922.
2 SHEETS—SHEET 2.
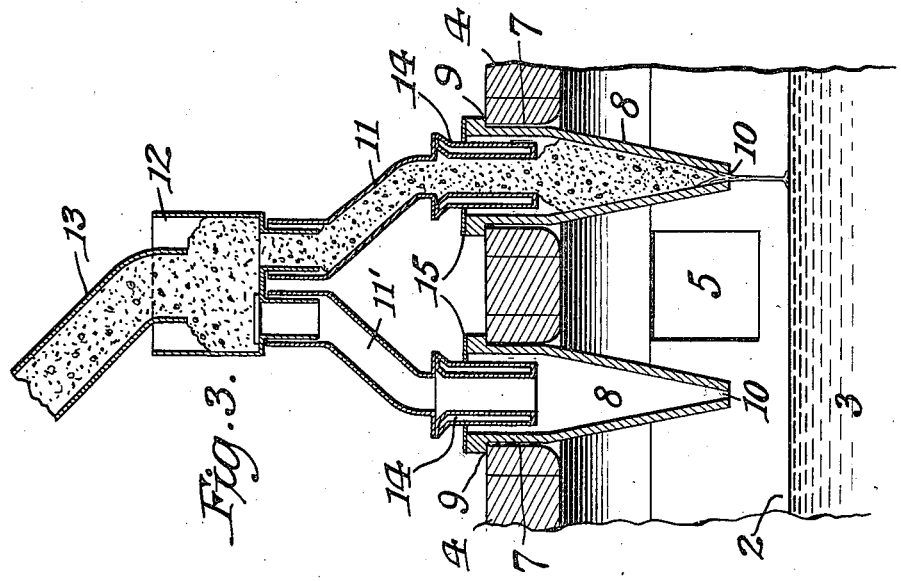
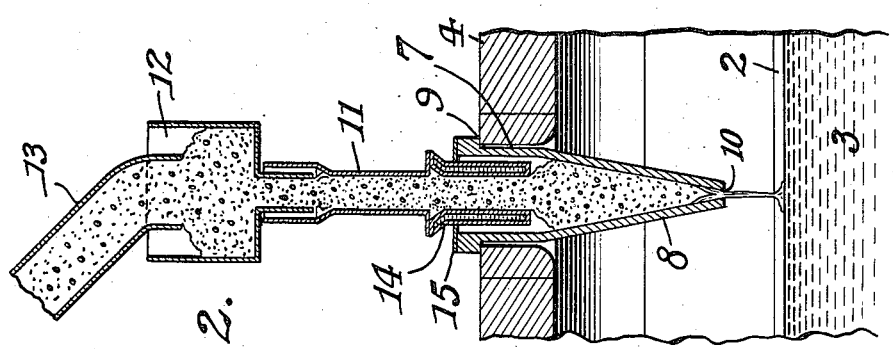
INVENTOR,
Robert Good
By Clarence D Kerr, Attorney

UNITED STATES PATENT OFFICE.

ROBERT GOOD, OF WASHINGTON, PENNSYLVANIA, ASSIGNOR TO HAZEL ATLAS GLASS CO., A CORPORATION OF WEST VIRGINIA.

METHOD OF AND APPARATUS FOR THE MANUFACTURE OF GLASS.

1,421,210. Specification of Letters Patent. Patented June 27, 1922.

Application filed December 1, 1919. Serial No. 341,732.

*To all whom it may concern:*

Be it known that I, ROBERT GOOD, a citizen of the United States, residing at Washington, Washington County, Pennsylvania, have invented new and useful Improvements in Method of and Apparatus for the Manufacture of Glass, of which the following is a specification, reference being had to the accompanying drawings, in which—

Fig. 1 is a section of a furnace or tank embodying my invention; Fig. 2 is a section on line II—II of Fig. 1; and Fig. 3 shows a modified form of my invention.

My invention relates to the manufacture of glass and comprises a method and apparatus for introducing raw materials into a glass melting furnace whereby the materials are fed into the furnace in a partially fused state, thereby accelerating the fusion of the glass and resulting in the production of glass of an improved quality. My invention also consists in the construction and arrangement of parts and in the method of using such apparatus, which I shall hereinafter describe and claim.

Referring to the drawings, 2 indicates the flux blocks which form the walls of a tank or furnace, 3 the body of molten and melting glass in the tank, 4 the arch forming what is commonly known as the "cap" or "crown" of the tank, and 5 shows approximately the location of a fire port in one of the furnace walls.

The arch 4 of the furnace supports a number of refractory blocks 6, so shaped that they articulate with the brick work of the arch and form a part thereof. The refractory blocks 6 preferably have circular apertures 7 therein in which are mounted the fusion cones 8, the weight of which is carried by the shoulders 9, which bear on the upper faces of the blocks 6. The fusion cones 8 have their lower and smaller ends depending an appreciable distance inside the furnace, and are made of glass-pot clay or any other good flux resisting material. The walls of the cones 8 are as thin as is consistent with the necessary strength, so that the heat of the furnace will be conducted as readily as possible to the material inside the cones. The lower end of each cone 8 has an orifice 10 of a size suitable to permit the material in the cone to flow through as soon as it becomes fused to a flowing consistency.

The glass making material is preferably supplied to each cone 8 through a metal sleeve 11, which leads from a reservoir 12 for the raw material, the supply of which is maintained through the chutes 13. The lower end of the sleeves 11, where they project into the upper ends of the cones 8, may have water cooled jackets 14 to prevent the sleeves from being affected by the heat radiated from the furnace. The upper end of each cone 8 is closed by a loose cover 15 apertured for the passage of the metal sleeve 11 therethrough. If desired, slides 16 may be employed to control the gravity flow of the material through the sleeves into the various cones.

In Fig. 3 I have shown two rows of cones 8 supplied from the same reservoir by means of the off-set sleeves 11'. It is obvious that the number of cones employed, whether in rows or in any other arrangement, may be varied in accordance with the size of furnace with which they are employed.

In carrying out my invention the material is fed by gravity through the chutes 13 into the reservoir 12 and from the reservoir 12 through the sleeves 11 into the cones 8. The walls of the cones 8 are kept at a high temperature by the heat of the furnace, and the weight of the mass of material in the cones causes it to press against the heated walls of the cones and begin to fuse, and, as fast as it becomes sufficiently fluid, it flows through the small orifices 10 in the lower ends of the cones into the furnace or tank and there mingles with the melted and melting glass already in the furnace.

The methods and apparatus which I have described are of great advantage, since by the preliminary melting in the cones, that portion of the heat, which ordinarily radiates upwardly against the arch and is thereby practically wasted, is utilized to effect the primary stages of fusion in the cones and thus decreases the amount of fuel required to melt a given quantity of material; and the fusion of the material in the cone is effected without the flame coming into contact with the material, thus insuring a minimum of discoloration usually resulting from the contact of the flame with such material. I have also found that, whereas in the usual operation of melting glass the unmelted material is ordinarily dumped while cold into the tank, which interferes with the refining process continually going on in the mass, by my improved process the refining operation proceeds more rapidly and the amount of refined glass produced per square foot of melting area is greatly augmented.

In the preliminary melting stages, the fluxes released are highly destructive and normally attack and destroy the furnace walls. The cones constructed and used in accordance with my invention bear the brunt of attack of the fluxes in the batch and when worn out by reason of such flux attack, can be readily removed and replaced, thereby serving to extend the life of the other parts of the tank, which ordinarily cannot be renewed without rebuilding the entire tank. By the use of my invention, also a regular automatic, gravity feed of materials into the tank is made possible.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The method of melting glass making material which comprises introducing the material into a melting tank wherein the material is fed vertically down through the tank in a receptacle of conical shape, wherein by reason of the lessening diameter of the receptacle the material is subjected to an ever increasing temperature until fusion is effected and the material runs by gravity into the bath in the tank.

2. The method of melting glass making material which comprises introducing the material into a melting chamber through a conical vertically disposed retort exposed on its exterior surface to the action of the heat in the chamber, whereby the material as it is fed downward through the retort by gravity is exposed to an ever increasing temperature until fusion is effected and the material runs out of the lower end of the retort into the molten bath in the tank.

3. The method of melting glass making material which comprises introducing the material into a temporary reservoir, feeding the material from the temporary reservoir into a series of conical retorts exposed on their exterior surfaces to heat in a furnace, whereby, when the material in the retorts becomes sufficiently fluid to flow, it will run in a partially fused state by gravity into a molten bath, and completing the fining operation in the tank.

4. In apparatus for melting glass making materials, a furnace or tank, cone-shaped receptacles depending through the roof of the furnace, each receptacle having its exterior exposed to the furnace gases, means for feeding the material into the upper end of the receptacles, each receptacle also having an orifice at its lower end to permit the fused glass to flow therefrom into the furnace or tank.

5. In apparatus for melting glass, a furnace or tank, at least one cone-shaped receptacle for the material depending into the interior of the furnace and exposed to the furnace gases, means for feeding the material into the upper end of the receptacle, the receptacle also having an orifice in its lower end to permit the fused glass to flow therefrom into the furnace or tank.

ROBERT GOOD.